US012018851B2

(12) United States Patent
Reider (10) Patent No.: US 12,018,851 B2
(45) Date of Patent: Jun. 25, 2024

(54) METHOD AND SYSTEM FOR CONTROLLING A VALVE IN AN HVAC SYSTEM

(71) Applicant: BELIMO HOLDING AG, Hinwil (CH)

(72) Inventor: Forest Reider, Seegraeben (CH)

(73) Assignee: BELIMO HOLDING AG, Hinwil (CH)

( * ) Notice: Subject to any disclaimer, the term of this patent is extended or adjusted under 35 U.S.C. 154(b) by 427 days.

(21) Appl. No.: 16/623,899

(22) PCT Filed: Jul. 17, 2018

(86) PCT No.: PCT/EP2018/069352
§ 371 (c)(1),
(2) Date: Dec. 18, 2019

(87) PCT Pub. No.: WO2019/020429
PCT Pub. Date: Jan. 31, 2019

(65) Prior Publication Data
US 2021/0148589 A1 May 20, 2021

(30) Foreign Application Priority Data
Jul. 26, 2017 (CH) ..................... 00970/17

(51) Int. Cl.
*F24F 11/30* (2018.01)
*F24F 11/63* (2018.01)
*F24F 11/65* (2018.01)
*F24F 11/84* (2018.01)
*F24F 110/10* (2018.01)
*G05B 15/02* (2006.01)
*G05D 7/06* (2006.01)

(52) U.S. Cl.
CPC .............. *F24F 11/30* (2018.01); *F24F 11/63* (2018.01); *F24F 11/65* (2018.01); *F24F 11/84* (2018.01);
(Continued)

(58) Field of Classification Search
CPC .......... F24F 11/63; F24F 11/84; G05D 7/0629
See application file for complete search history.

(56) References Cited

U.S. PATENT DOCUMENTS 5,916,251 A * 6/1999 Sibik ..................... F25B 49/043
62/497
6,095,426 A * 8/2000 Ahmed .................... F24F 11/62
236/78 D
(Continued)

FOREIGN PATENT DOCUMENTS

CN 105222442 A * 1/2016
WO 2014/183868 A2 11/2014

OTHER PUBLICATIONS

Translated_Zhou (Year: 2016).*
(Continued)

*Primary Examiner* — Elizabeth J Martin
*Assistant Examiner* — Samba Nmn Gaye
(74) *Attorney, Agent, or Firm* — Sughrue Mion, PLLC (57) ABSTRACT

For controlling opening (B2) of a valve in an HVAC system to regulate the fluid flow through a thermal energy exchanger and adjust power transfer of the thermal energy exchanger, a control system sets (S6) a control signal for the valve to different setpoints and records (S1) a plurality of data points. Each data point includes for a certain setpoint operating data values related to the power transfer effectuated by the thermal energy exchanger with the control signal set to the certain setpoint. The control system determines (S2) a fitting curve for the data points and determines (S3) a transformation which transforms the fitting curve into a transformed curve having a given target shape. The control system controls (B2) the opening of the valve by transforming (S5) the setpoint to a transformed setpoint, using the
(Continued)

transformation, and setting (S6) the control signal for the valve to the transformed setpoint.

20 Claims, 5 Drawing Sheets

(52) U.S. Cl.
CPC ........ *G05D 7/0629* (2013.01); *F24F 2110/10* (2018.01); *G05B 15/02* (2013.01); *G05B 2219/2614* (2013.01)

(56) References Cited

U.S. PATENT DOCUMENTS

| | | | |
|---|---|---|---|
| 6,352,106 B1 | 3/2002 | Hartman | |
| 6,701,726 B1* | 3/2004 | Kolk | F25B 49/043 62/476 |
| 8,136,363 B2* | 3/2012 | Ludwig | B60H 1/00014 62/81 |
| 2016/0054741 A1* | 2/2016 | Thuillard | F24F 11/62 700/276 |
| 2016/0377306 A1 | 12/2016 | Drees et al. | |
| 2017/0129311 A1* | 5/2017 | Li | B60H 1/3205 |
| 2017/0241657 A1* | 8/2017 | Salsbury | F24F 11/62 |
| 2018/0087790 A1* | 3/2018 | Perez | F24F 11/52 |
| 2019/0353385 A1* | 11/2019 | Aucoin | G05D 23/1919 |

OTHER PUBLICATIONS

Written Opinion of the International Searching Authority of PCT/EP2018/069352 dated Oct. 9, 2018.

International Search Report of PCT/EP2018/069352 dated Oct. 9, 2018.

* cited by examiner

METHOD AND SYSTEM FOR CONTROLLING A VALVE IN AN HVAC SYSTEM

CROSS REFERENCE TO RELATED APPLICATIONS

This application is a National Stage of International Application No. PCT/EP2018/069352 filed Jul. 17, 2018, claiming priority based on Swiss Patent Application No. 00970/17 filed Jul. 26, 2017.

FIELD OF THE INVENTION

The present invention relates to a method and a control system for controlling opening of a valve in an HVAC system. Specifically, the present invention relates to a method and a control system for controlling opening of a valve in an HVAC system to regulate a flow of a fluid through a thermal energy exchanger of the HVAC system and adjust power transfer of the thermal energy exchanger.

BACKGROUND OF THE INVENTION

By regulating the flow of fluid through thermal energy exchangers of an HVAC system, it is possible to adjust the amount of energy exchanged by the thermal energy exchangers and thus the power transfer of the thermal energy exchangers. For example, the energy exchange or the power transfer, respectively, is adjusted by regulating the amount of energy delivered by a heat exchanger to heat or cool a room in a building, or by regulating the amount of energy drawn by a chiller for cooling purposes. While the fluid transport through the fluid circuit of the HVAC system is driven by one or more pumps, the flow is typically regulated by varying the opening or position of valves, e.g. manually or by way of actuators. The efficiency of thermal energy exchangers is reduced at high flow rates where the fluid rushes at an increased rate through the thermal energy exchangers, without resulting in a significant increase in energy exchange. Moreover, the actual power transfer characteristics of thermal energy exchangers in an HVAC system depend on building or plant characteristics and various environmental conditions such as temperature, humidity, etc.

U.S. Pat. No. 6,352,106 describes a self-balancing valve having a temperature sensor for measuring the temperature of a fluid passing through the valve. According to U.S. Pat. No. 6,352,106, the range and thus the maximum opening of the valve are adjusted dynamically, depending on the measured temperature. The opening of the valve is modulated based on a stored temperature threshold value, the current fluid temperature, and a position command signal from a load controller. Specifically, the opening range of the valve is set periodically by a position controller, based on a temperature threshold value stored at the position controller, the current fluid temperature, and the difference between the previously measured fluid temperature and the current fluid temperature. U.S. Pat. No. 6,352,106 further describes an alternative embodiment with two temperature sensors, one placed on the supply line and the other one placed on the return line, for measuring the actual differential temperature over the load, i.e. the thermal energy exchanger. According to U.S. Pat. No. 6,352,106, in this alternative embodiment, the threshold temperature is a threshold differential temperature across the load determined by system requirements of the load. Thus, U.S. Pat. No. 6,352,106 describes controlling the flow based on a change in fluid temperature or a change in a differential temperature over the load. Accordingly, the flow is controlled based on a comparison of determined temperature changes to fixed threshold temperatures or threshold differential temperatures, respectively, which must be predefined and stored at the valve's position controller. Consequently, to avoid incorrect and inefficient settings of the valve, it must be ensured, at initial installation time of the system and whenever thermal energy exchangers are replaced with new models, that the stored threshold temperatures or threshold differential temperatures, respectively, match the type and design parameters of thermal energy exchangers used in the HVAC system.

SUMMARY OF THE INVENTION

It is an object of this invention to provide a method and a control system for regulating a flow of a fluid through a thermal energy exchanger of an HVAC system to adjust the power transfer of the thermal energy exchanger, which method and control system do not have at least some of the disadvantages of the prior art. In particular, it is an object of the present invention to provide a method and a control system for regulating the flow of the fluid to obtain a defined power transfer characteristics of the thermal energy exchanger.

According to the present invention, these objects are achieved through the features of the independent claims. In addition, further advantageous embodiments follow from the dependent claims and the description.

According to the present invention, the above-mentioned objects are particularly achieved in that for controlling power transfer of a thermal energy exchanger of an HVAC system, the opening of a valve in the HVAC system is controlled by a control system to adjust a flow of a fluid through the thermal energy exchanger by setting a control signal for the valve responsive to different setpoints. A plurality of data points are recorded in the control system. Each of the data points includes for a certain setpoint operating data values related to the power transfer effectuated by the thermal energy exchanger with the control signal for the valve set responsive to the certain setpoint. The control system determines a fitting curve which fits the plurality of data points. The control system determines a transformation which transforms the fitting curve into a transformed curve having a given target shape. The control system controls the opening of the valve by transforming the setpoint to a transformed setpoint, using the transformation, and setting the control signal for the valve based on the transformed setpoint.

In an embodiment, determining the transformation comprises the control system determining a linearization transformation which transforms the fitted curve into a linearized curve.

In a further embodiment, recording the plurality of data points comprises the control system determining the operating data values with the control signal for the valve set responsive to the certain setpoint and the operating data values including: the flow of the fluid, a temperature difference between an inlet temperature of the fluid entering the thermal energy exchanger and an outlet temperature of the fluid exiting the thermal energy exchanger, and/or the power transfer effectuated by the thermal energy exchanger.

In an embodiment, recording the plurality of data points comprises the control system determining the power transfer effectuated by the thermal energy exchanger with the control signal for the valve set responsive to the certain setpoint.

Determining the fitting curve comprises the control system determining a power transfer curve which fits the plurality of data points. The power transfer curve indicates power transfer as a function of setpoint. Determining the transformation comprises the control system determining a linearization transformation which transforms the power transfer curve into a linearized power transfer curve. Controlling the opening of the valve comprises the control system transforming the setpoint to the transformed setpoint, using the linearization transformation.

In a further embodiment, determining the power transfer effectuated by the thermal energy exchanger comprises the control system measuring the flow of the fluid, an inlet temperature of the fluid entering the thermal energy exchanger, and an outlet temperature of the fluid exiting the thermal energy exchanger.

In an embodiment, the control system performs on an ongoing basis the recording of the data points, the determining of the fitting curve, and the determining of the transformation, for an iterative adjustment of a power transfer characteristics of the thermal energy exchanger in the HVAC system.

In a further embodiment, the control system performs a learning phase. The learning phase comprises the recording of the data points, the determining of the fitting curve, and the determining of the transformation. Subsequent to the learning phase, while no longer recording at least some operating data values, the control system performs a regulating phase. The regulating phase comprises the controlling of the opening of the valve by transforming the setpoint to a transformed setpoint, using the transformation determined in the learning phase, and setting the control signal for the valve to the transformed setpoint.

When the measured data are correlated with the target independent parameter, a unique and distinct relationship is observed that may remain in practice, even when one or more of the measured variables are lost or missing. In other words, the transformation determined during the learning phase can be used for deriving transformed setpoints in the regulating phase, even when measurements of at least some of the operating data values are currently not available or possible, be it for the reason that a respective measurement sensor or communication line is defective or that a respective measurement device is connected only temporarily during the learning phase, for example. Provided that the conditions determining the operating data values, e.g. temperature, flow, differential pressure, etc., do not fluctuate beyond a certain degree, the transformation determined in the learning phase continues (in the regulation phase) to produce transformed setpoints which control the opening of the valve and thereby adjust the flow of fluid through the thermal energy exchanger in such a fashion that the power transfer characteristics of the thermal energy exchanger corresponds or is at least close to the target characteristics as defined by the given target shape of the fitting curve. In the case of the linear target shape, for example, the linearization transformation determined in the learning phase would still produce transformed setpoints that result in a linear power transfer characteristics of the thermal energy exchanger.

In an embodiment, the learning phase further comprises connecting at least one measurement device for measuring the operating data values related to the power transfer, prior to the recording of the data points, and disconnecting the measurement device prior to the regulating phase.

In addition to the method of controlling power transfer of a thermal energy exchanger in an HVAC system, the present invention also relates to a control system for controlling power transfer of a thermal energy exchanger in an HVAC system. The control system comprises at least one processor configured to: control the opening of a valve in the HVAC system to adjust a flow of a fluid through the thermal energy exchanger by setting a control signal for the valve responsive to different setpoints; record in the control system a plurality of data points, each of the data points including for a certain setpoint operating data values related to the power transfer effectuated by the thermal energy exchanger with the control signal for the valve set responsive to the certain setpoint; determine a fitting curve which fits the plurality of data points; determine a transformation which transforms the fitting curve into a transformed curve having a given target shape; and control the opening of the valve by transforming the setpoint to a transformed setpoint, using the transformation, and setting the control signal for the valve based on the transformed setpoint.

In an embodiment, the processor is further configured to determine the transformation by determining a linearization transformation which transforms the fitted curve into a linearized curve.

In a further embodiment, the processor is further configured to record the plurality of data points by determining the operating data values with the control signal for the valve set responsive to the certain setpoint and the operating data values including: the flow of the fluid, a temperature difference between an inlet temperature of the fluid entering the thermal energy exchanger and an outlet temperature of the fluid exiting the thermal energy exchanger, and/or the power transfer effectuated by the thermal energy exchanger.

In an embodiment, the processor is further configured to record the plurality of data points by determining the power transfer effectuated by the thermal energy exchanger with the control signal for the valve set responsive to the certain setpoint; to determine the fitting curve by determining a power transfer curve which fits the plurality of data points, the power transfer curve indicating power transfer as a function of setpoint; to determine the transformation by determining a linearization transformation which transforms the power transfer curve into a linearized power transfer curve; and to control the opening of the valve by transforming the setpoint to the transformed setpoint, using the linearization transformation.

In a further embodiment, the processor is further configured to determine the power transfer effectuated by the thermal energy exchanger by measuring the flow of the fluid, an inlet temperature of the fluid entering the thermal energy exchanger, and an outlet temperature of the fluid exiting the thermal energy exchanger.

In an embodiment, the processor is further configured to record the data points, determine the fitting curve, and determine the transformation on an ongoing basis, for an iterative adjustment of a power transfer characteristics of the thermal energy exchanger in the HVAC system.

In a further embodiment, the processor is further configured to perform a learning phase. The learning phase comprises the processor recording the data points, determining the fitting curve, and determining the transformation. The processor is further configured to perform a regulating phase, subsequent to the learning phase, while no longer recording at least some operating data values. The regulating phase comprises the processor controlling the opening of the valve by transforming the setpoint to a transformed setpoint, using the transformation determined in the learning phase, and setting the control signal for the valve responsive to the transformed setpoint.

In an embodiment, the processor is further configured to perform the learning phase by connecting at least one measurement device for measuring the operating data values related to the power transfer, prior to recording the data points, and disconnecting the measurement device prior to performing the regulating phase.

In addition to the method and the control system for controlling opening of a valve in an HVAC system, the present invention also relates to a computer program product comprising a non-transient computer-readable medium having stored thereon computer program code configured to control a processor of a control system for controlling power transfer of a thermal energy exchanger of an HVAC system. The computer program code is configured to control the processor such that the processor performs the steps of: controlling the opening of a valve in the HVAC system to adjust a flow of a fluid through the thermal energy exchanger by setting a control signal for the valve responsive to different setpoints; recording a plurality of data points, each of the data points including for a certain setpoint operating data values related to the power transfer effectuated by the thermal energy exchanger with the control signal for the valve set responsive to the certain setpoint; determining a fitting curve which fits the plurality of data points; determining a transformation which transforms the fitting curve into a transformed curve having a given target shape; and controlling the opening of the valve by transforming the setpoint to a transformed setpoint, using the transformation, and setting the control signal for the valve based on the transformed setpoint.

In various embodiments, the computer program code is further configured to control the processor such that the processor performs the method of controlling power transfer of a thermal energy exchanger of an HVAC system.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
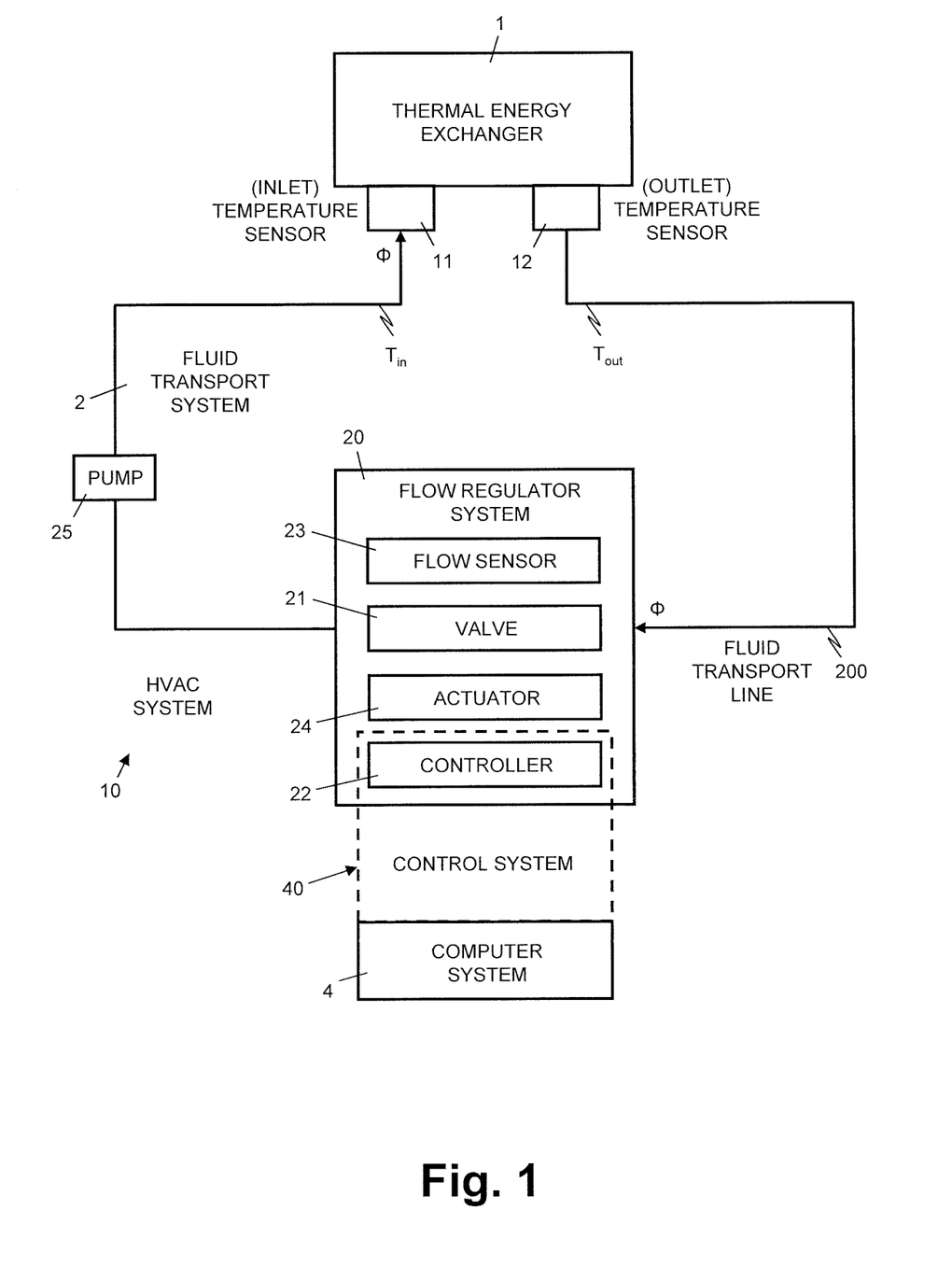
FIG. 1: shows a block diagram illustrating schematically an HVAC system, comprising a thermal energy exchanger and a thermal transfer fluid transport system with a flow regulator system.

In FIGS. 1-4, reference numeral 10 refers to an HVAC system (Heating, Ventilation, Air Conditioning, and Cooling). As illustrated in FIG. 1, the HVAC system 10 comprises a thermal energy exchanger 1, e.g. a heat exchanger for heating or a cooling device for cooling. As further illustrated in FIG. 1, the HVAC system 10 comprises a fluid transport system 2 for moving a (thermal transfer) fluid, e.g. water or a refrigerant, through the thermal energy exchanger 1. As indicated schematically in FIG. 1, the fluid transport system 2 comprises fluid transport lines 200 (conduits, pipes), for conducting a flow of fluid through the thermal energy exchanger 1, a flow regulator system 20 and a pump 25, for driving and controlling the flow of the fluid through the thermal energy exchanger 1. As further illustrated in FIG. 1, the flow regulator system 20 comprises a (motorized) valve 21 with an actuator 24, a controller 22, and a flow sensor 23. The HVAC system 10 further comprises a temperature sensor 11, for determining the temperature of the fluid entering the thermal energy exchanger 1, and a temperature sensor 12 for determining the temperature of the fluid exiting the thermal energy exchanger 1. The sensors further comprise a communication module configured for wireless and/or wired data communication with the computer system 4 and/or the controller 22.

Figure 2:
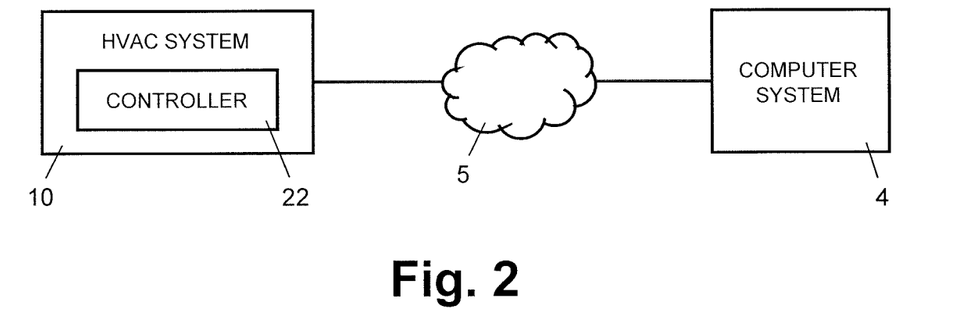
FIG. 2: shows a block diagram illustrating schematically an HVAC system connected via a communication network to a remote computer system.
Figure 3:
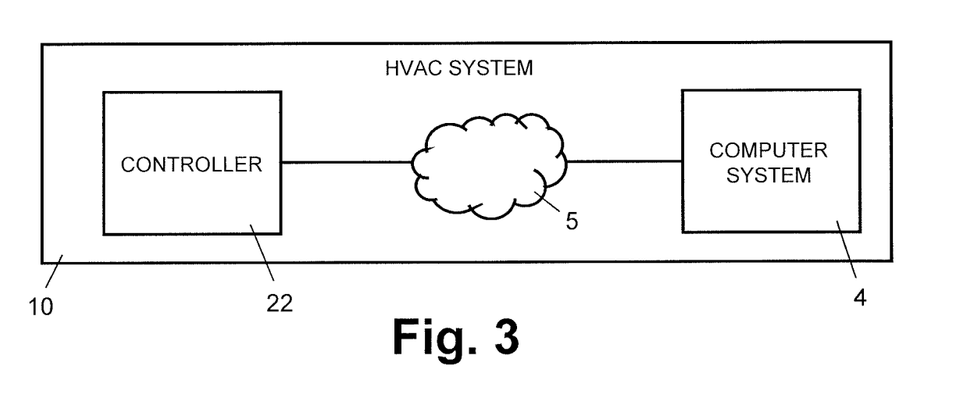
FIG. 3: shows a block diagram illustrating schematically an HVAC system comprising a controller that is connected via a communication network to a local computer system.
Figure 4:
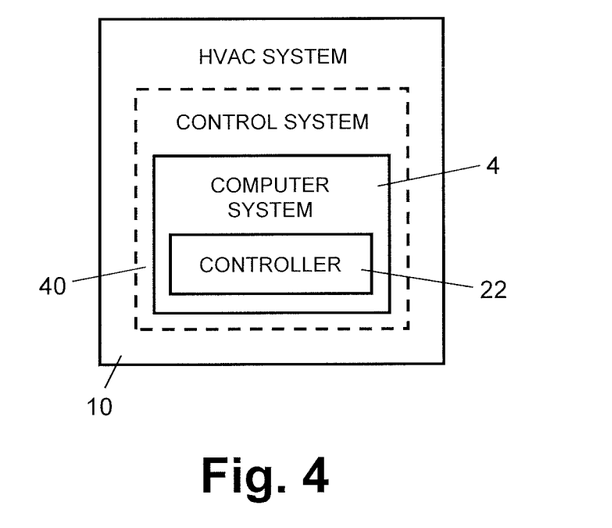
FIG. 4: shows a block diagram illustrating schematically an HVAC system comprising a computer system with a controller.

As illustrated in FIGS. 1-4, the HVAC system 10 comprises or is at least connected via a communication network 5 to a computer system 4. Depending on the embodiment, the computer system 4 comprises one or more operational computers with one or more programmable processors and a data storage system connected to the processor(s). As indicated schematically in FIGS. 1 and 4 by reference numeral 40, the computer system 4 and the controller 22 constitute a control system, particularly a computerized HVAC control system. In the embodiment of FIG. 2, the HVAC system 10 and one or more of its controllers 22 are connected via communication network 5 to a remote computer system 4, e.g. a cloud-based computer system connected to the HVAC system 10 via the Internet. In the embodiment of FIG. 3, the computer system 4 is a part of the HVAC system 10 and is connected via a communication network 5, such as a LAN (Local Area Network) or WLAN (Wireless Local Area Network), to one or more controllers 22 of the HVAC system 10. In the embodiment of FIG. 4, the computer system 4 is a part of the HVAC system 10 and the controller 22 is part of the computer system 4 or the controller 22 constitutes the computer system 4, respectively. The controller 22 includes an electronic circuit, e.g. a programmable processor, an application specific integrated circuit (ASIC), or another logic unit. The controller 22 further comprises a communication module configured for wireless and/or wired data communication with the computer system 4, the temperature sensors 11, 12, the flow sensor 23, and the valve 21 or its actuator, respectively, to control the flow of fluid. The controller 22 and the computer system 4 are configured (programmed) to perform various functions described later in more detail. Depending on the embodiment the communication network 5 includes fixed communication networks or busses and/or mobile communication networks, e.g. WLAN, GSM (Global System for Mobile Communications), UMTS (Universal Mobile Telephone System), or other mobile radio networks.

The controller 22 is configured to control the opening of the valve 21 in response to a setpoint C received from a building control system or a user terminal, for example, for adjusting the flow Φ of the fluid through the thermal energy exchanger 1. For that purpose the controller 22 generates a control signal for the valve 21 or its actuator 24, respectively, based and depending on the received setpoint C. Depending on a selected or set control mode, the controller 22 generates the control signal using one or more operating data values related to the power transfer $\dot{Q}_D$ effectuated by the thermal energy exchanger 1 23 to obtain the target defined by the received setpoint C. For example, in a flow based control mode, illustrated in FIG. 5, the controller 22 generates the control signal using the current flow Φ measured by the flow sensor 23 to obtain the target defined by the received setpoint C. In an energy or power based control mode, the controller 22 generates the control signal further using the temperature of the fluid entering the thermal energy exchanger 1 and the temperature of the fluid exiting the thermal energy exchanger 1 measured by the temperature sensors 11 and 12, respectively, in addition to the current flow Φ to obtain the target defined by the received setpoint C. In a position based control mode, illustrated in FIG. 5a and executed, for example, if the flow sensor 23 is defective or not available, the controller 22 generates the control signal using the current valve position of the valve 21, as provided by the valve 21 or actuator 24, for example, to obtain the target defined by the received setpoint C.

Figure 6:
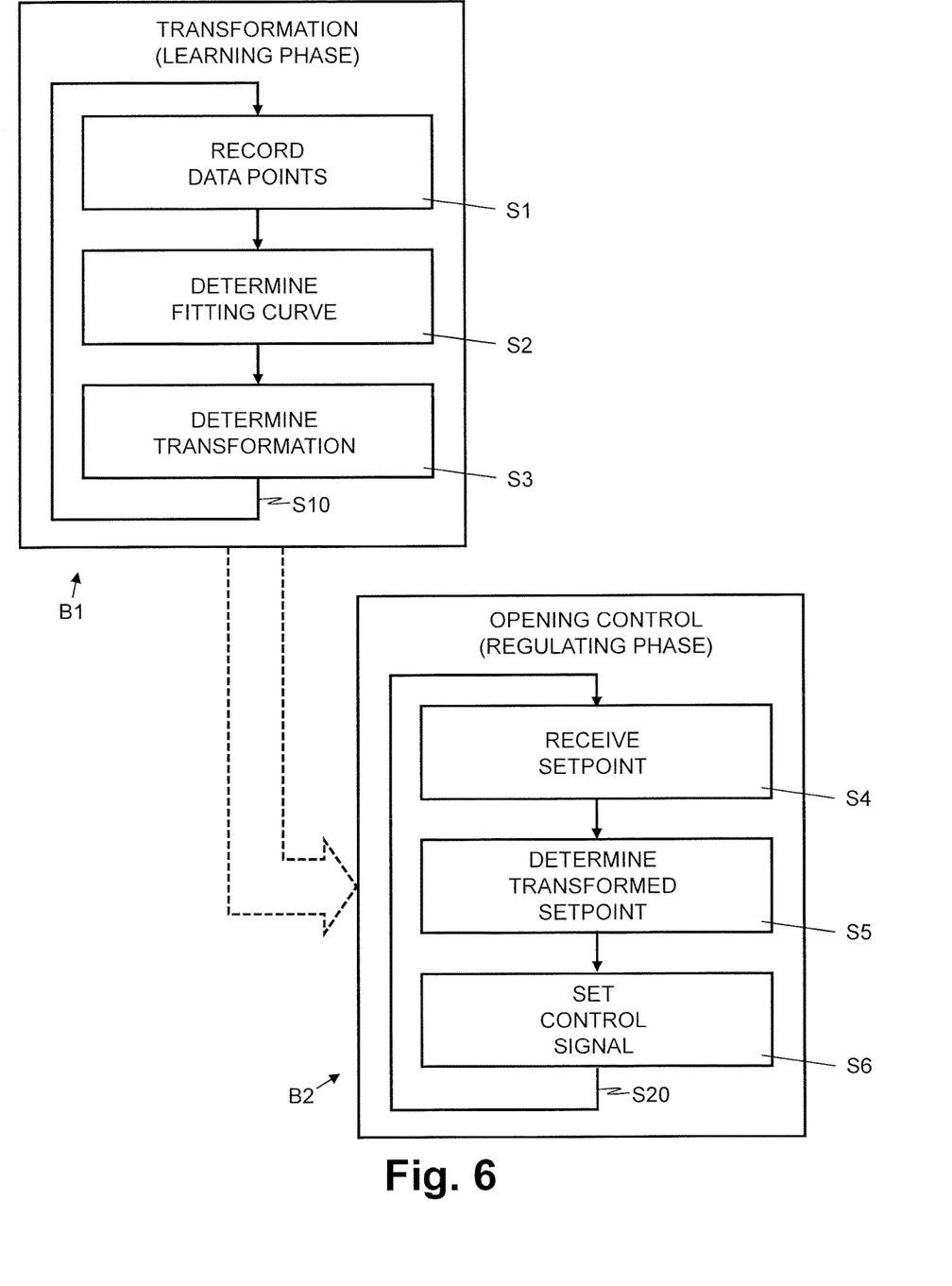
FIG. 6: shows a flow diagram illustrating an exemplary sequence of steps for determining a transformation for transforming a fitting curve to a transformed curve having a target shape, and for controlling the power transfer of a thermal energy exchanger of an HVAC system by setting the control signal for a valve based on a transformed setpoint which is obtained through the transformation.

In the following paragraphs, described with reference to FIG. 6 are possible sequences of steps performed by the control system 40, the computer system 4, and/or controller 22, respectively, for controlling the power transfer $\dot{Q}$ of the thermal energy exchanger 1 by adjusting the opening (i.e. the orifice) of the valve 21 to regulate the flow Φ of the fluid through the thermal energy exchanger 1, responsive to a received setpoint C.

Figure 5:
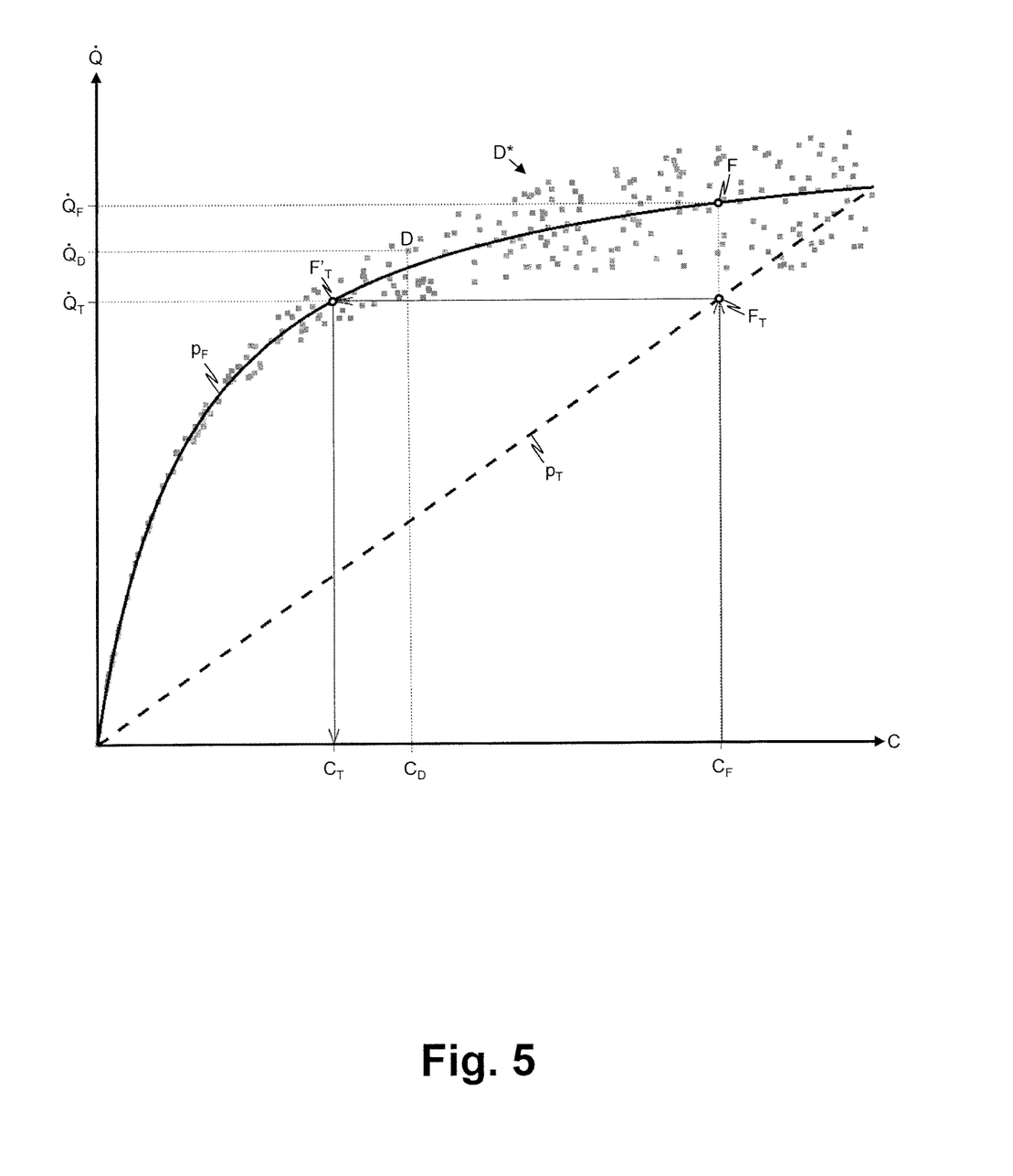
FIGS. 5 and 5a: show graphs illustrating a plurality of data points, each data point indicating for a certain setpoint operating data values, related to the power transfer effectuated by the thermal energy exchanger, a fitting curve which fits the data points, and a transformed curve having a target shape.
Figure 5A:
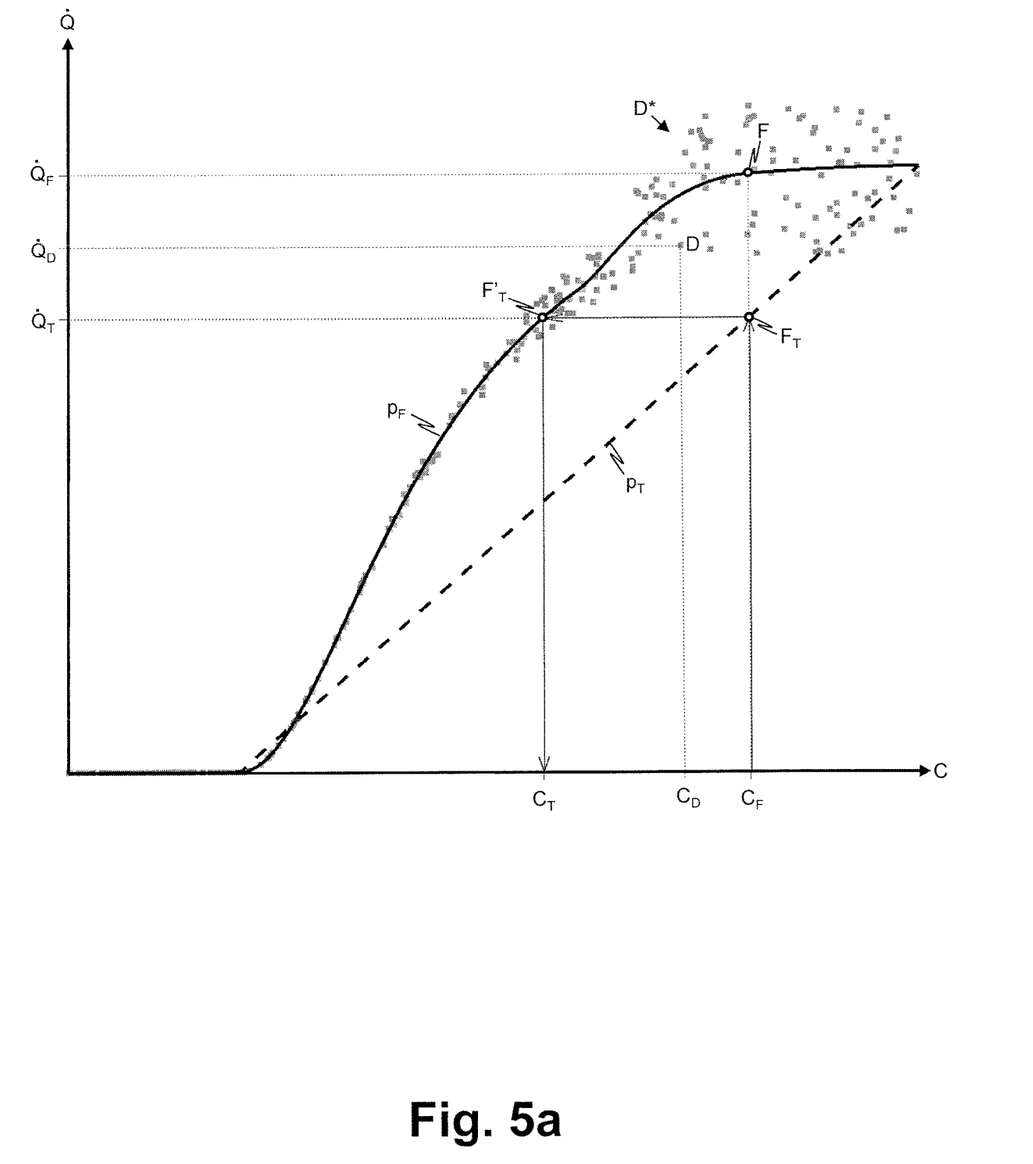

Block B1 relates to a learning phase and comprises steps S1, S2, and S3 for determining a transformation for transforming a fitting curve $p_F$ to a transformed curve $p_T$ with a target shape, e.g. as illustrated in FIGS. 5 and 5a a linearization transformation for transforming the fitting curve $p_F$ to a transformed curve $p_T$ with a linear shape, i.e. a linearized curve $p_T$. Block B2 relates to a regulating phase and comprises steps S4, S5, and S6 for controlling the power transfer $\dot{Q}$ of the thermal energy exchanger 1 by adjusting the opening of the valve 21 by setting the control signal for the valve 21 based on a transformed setpoint $C_T$, in adherence with the determined transformation, as will be described below in more detail.

In step S1, the control system 40, i.e. the computer system 4 or the controller 22, respectively, records a plurality of data points D*. Each data point D of the plurality of data points D* is related to the power transfer $\dot{Q}_D$ effectuated by the thermal energy exchanger 1 with the control signal for the valve 21 set responsive to a certain setpoint $C_D$, as illustrated schematically in FIGS. 5 and 5a. Specifically, each data point D includes a setpoint $C_D$ and measured operating data values related to the power transfer $\dot{Q}_D=\dot{Q}(C_D)$ effectuated by the thermal energy exchanger 1 when the control signal for the valve 21 is set in response and adherence to the respective setpoint $C_D$. Depending on the embodiment and/or configuration, the operating data values related to the effectuated power transfer $\dot{Q}_D$ which are recorded with a data point D include the flow Φ of the fluid, the temperature difference ΔT between the current inlet temperature Tin of the fluid entering the thermal energy exchanger 1 and the current outlet temperature Tout of the fluid exiting the thermal energy exchanger 1, the actual power transfer $\dot{Q}_D$ effectuated by the thermal energy exchanger 1, and/or the current position of the valve 21 or its actuator 24, respectively.

Depending on the embodiment or configuration, the (measured) operating data values for the data points D* are read from sensors, e.g. flow sensor 23, temperature sensor 11, and temperature sensor 12, by the computer system 4 or the controller 22, or reported by the sensors to the computer system 4 or the controller 22. Alternatively, the operating data values are collected by the controller 22 and later reported to the computer system 4. Any data point D*, D represents operating data values measured by the control system 40 at a particular point in time (time stamp).

In step S2, the control system 40, i.e. the computer system 4 or the controller 22, respectively, determines a fitting curve $p_F$ which fits the plurality of data points D* recorded in step S1. The fitting curve $p_F$ has a best fit with the plurality of data points D*, as illustrated schematically in FIGS. 5 and 5a. In an embodiment, the fitting curve $p_F$, is a power transfer curve $p_F$ which fits the plurality of data points D* and indicates the power transfer $\dot{Q}=p_F(C)$ as a function of setpoint C. The fitting curve $p_F$, is determined from the plurality of data points D* using a spline or polynomial method, for example, which are well known to the person skilled in the art.

In step S3, the control system 40, i.e. the computer system 4 or the controller 22, respectively, determines a transformation which transforms the fitting curve $p_F$ into a transformed curve $p_T$ having a given target shape. In an embodiment, the target shape is a linear target shape, and the transformation is a linearization transformation which transforms the fitting curve $p_F$ into a linearized curve $p_r$. In an embodiment the linearization transformation transforms the power transfer curve $p_F$ into a linearized power transfer curve $p_T$. One skilled in the art will understand, that any other target shape of the transformed curve $p_T$ can be obtained through a respective transformation of the fitting curve $p_F$. As illustrated in FIGS. 5, 5a, through the transformation, any point F on the fitting curve $p_F$, resulting in an energy transfer $\dot{Q}_F=p_F(C_F)$ at setpoint $C_F$, is mapped to a corresponding point $F_T$ on the transformed curve $p_T$, such that the energy transfer $\dot{Q}_T=p_T(C_F)$, obtained with the setpoint $C_F$ on the transformed curve $p_T$, is equal to the energy transfer $\dot{Q}_T=p_F(C_T)$, obtained on the fitting curve $p_F$ with a transformed setpoint $C_T$. In other words, a transformation of the fitting curve $p_F$ into the transformed curve $p_T$ is achieved by transforming a setpoint $C_F$ into a transformed setpoint $C_T=T(C_F)$ such that the energy transfer $\dot{Q}_T=p_T(C_F)$, obtained with the setpoint $C_F$ on the transformed curve $p_T$, is equal to the energy transfer $\dot{Q}_T=p_F(C_T)$, obtained on the fitting curve $p_F$ with the transformed setpoint $C_T$:

$$\dot{Q}_T=p_T(C_F)=p_F(C_T)$$

$$C_T=T(C_F)=p_F^{-1}(p_T(C_F))$$

Whereby $p_F^{-1}(\dot{Q}_F)=C_F$ is an inverse function which determines the setpoint $C_F$ required to obtain a given energy transfer $\dot{Q}_F$ on the fitting curve $p_F$. In plain words, the transformed setpoint $C_T$ of a given setpoint $C_F$ is obtained by determining the energy transfer $\dot{Q}_T=p_T(C_F)$ for the given setpoint $C_F$ using the transformed curve $p_T$, and then determining the setpoint required to achieve the same energy transfer $\dot{Q}_T$ using the fitting curve $p_F$. In an embodiment, the transformation $C_T=T(C_F)$ is implemented by generating and storing a mapping table which maps any setpoint $C_F$ to a transformed setpoint $C_T$, for the underlying fitting curve $p_F$ and transformed curve $p_T$.

In an embodiment, the control system 40, i.e. the computer system 4 or the controller 22, respectively, performs a normalization step which generates normalized data points and/or a normalized fitting curve. The normalization of the data points D* or the fitting curve $p_F$ is executed using normalization variables which are either data values included in the data points D* or fixed parameter values. Through the normalization step, data redundancy is reduced and data independency is increased. In the present context, the normalization reduces measured operational data of the data points D* to a single function or curve through mathematical transformation of the data.

As indicated schematically in FIG. 6 by step S10, the control system 40, i.e. the computer system 4 or the controller 22, respectively, performs the steps of the learning phase B1, i.e. the recording of the data points D* and the determining of the fitting curve $p_F$ and transformation $C_T=T(C_F)$, on an ongoing basis, e.g. continuously or periodically. Thereby, the power transfer characteristics $\dot{Q}(C)$ of the thermal energy exchanger 1 is adjusted iteratively, making it possible to adapt to (gradual or abrupt) changes in the HVAC system 10 or its environment. One skilled in the art will appreciate, however, that in scenarios with moderate fluctuation of the operating data values in the HVAC system 10, the steps S1, S2, S3 can be executed during a temporarily limited learning phase B1, e.g. using one or more measurement devices with sensors which are connected to the HVAC system 10 only temporarily during the learning phase B1 ("clamp on devices"), for recording the plurality of data points D*, D related to the power transfer $\dot{Q}_D$ effectuated by the thermal energy exchanger 1 for a variety of setpoints $C_D$. Thus, in such a scenario, the steps S4, S5, S6 of the subsequent regulating phase B2 are executed once the learning phase B1 is complete, e.g. when the measurement equipment has been removed and the transformation has been determined. The regulating phase B2 is also executable when the measurement devices and/or its sensors are defective; for example, the position based control mode is executable based on the previously learned fitting curve $p_F$ and transformation $C_T=T(C_F)$.

In step S4, the control system 40, i.e. the computer system 4 or the controller 22, respectively, receives a setpoint $C_F$ for a targeted power transfer and responsive setting of the control signal of the valve 21, e.g. from a building control system or a user terminal.

In step S5, the control system 40, i.e. the computer system 4 or the controller 22, respectively, uses the transformation (determined in the learning phase B1) to calculate a transformed setpoint $C_T=T(C_F)$ from the received setpoint $C_F$.

In step S6, the control system 40, i.e. the computer system 4 or the controller 22, respectively, generates the control signal of the valve 21 responsive to and in adherence with the transformed setpoint $C_T$ (e.g. in flow based, power based, energy based, or position based control mode). Consequently, the opening (i.e. the orifice) of the valve 21 is adjusted by its actuator 24 in accordance with the transformed setpoint $C_T$ used to generate the control signal of the valve 21. Accordingly, the power transfer characteristics $\dot{Q}(C)$ of the thermal energy exchanger 1 is regulated or transformed, respectively, to a target characteristics $\dot{Q}(C)$ having a target shape, e.g. a linear power transfer characteristics $\dot{Q}(C)=p_T(C)$.

As indicated schematically in FIG. 6 by step S20, the control system 40, i.e. the computer system 4 or the controller 22, receives setpoints C or respective commands on an ongoing basis, as submitted by a building control system or a user terminal.

It should be noted that, in the description, the sequence of the steps has been presented in a specific order, one skilled in the art will understand, however, that the order of at least some of the steps could be altered, without deviating from the scope of the invention.

The invention claimed is:

1. A method of controlling power transfer of a thermal energy exchanger of an HVAC system, the method comprising:
    setting, by a control system, a control signal for a valve responsive to a plurality of setpoints in the HVAC system;
    controlling, by the control system, an opening of the valve to adjust a flow of a fluid through the thermal energy exchanger, based on the control signal;
    measuring, by the control system, operating data values for each of the plurality of setpoints, the operating data values being related to the power transfer by the thermal energy exchanger;
    recording, in the control system, a plurality of data points, each of the data points including, for a setpoint of the plurality of setpoints, the measured operating data values related to the power transfer by the thermal energy exchanger for the setpoint;
    determining, by the control system, a fitting curve which fits the plurality of data points;
    determining, by the control system, a transformation which maps points on the fitting curve resulting in an energy transfer at a given setpoint to a corresponding point on a transformed curve, the transformed curve having a given target shape;
    transforming a setpoint for the opening of the valve to a transformed setpoint, using the transformation, and setting the control signal for the valve based on the transformed setpoint; and
    controlling, by the control system, the opening of the valve according to the set control signal.

2. The method of claim 1, wherein the transformation is a linearization transformation and the transformed curve is a linearized curve.

3. The method of claim 1, wherein recording the plurality of data points comprises setting the control signal for the valve according to the setpoint and determining the operating data values, and
    wherein the operating data values include at least one of: the flow of the fluid, a temperature difference between an inlet temperature of the fluid entering the thermal energy exchanger and an outlet temperature of the fluid exiting the thermal energy exchanger, and the power transfer effectuated by the thermal energy exchanger.

4. The method of claim 1,
    wherein recording the plurality of data points comprises setting the control signal for the valve based on the setpoint, and determining the power transfer effectuated by the thermal energy exchanger;
    wherein determining the fitting curve comprises determining a power transfer curve which fits the plurality of data points, the power transfer curve indicating power transfer as a function of the plurality of setpoints;
    wherein determining the transformation comprises determining a linearization transformation which transforms the power transfer curve into a linearized power transfer curve; and
    wherein controlling the opening of the valve comprises transforming a setpoint of the plurality of setpoints to the transformed setpoint, using the linearization transformation.

5. The method of claim 4, wherein determining the power transfer by the thermal energy exchanger comprises measuring the flow of the fluid, an inlet temperature of the fluid entering the thermal energy exchanger, and an outlet temperature of the fluid exiting the thermal energy exchanger.

6. The method of claim 1, wherein the control system performs on an ongoing basis the recording of the plurality of data points, the determining of the fitting curve, and the determining of the transformation, for an iterative adjustment of a power transfer characteristic of the thermal energy exchanger in the HVAC system.

7. The method of claim 1, wherein the method comprises:
performing a learning phase, the learning phase comprising the recording of the data points, the determining of the fitting curve, and the determining of the transformation; and
performing subsequent to the learning phase, while no longer recording one or more of the operating data values, a regulating phase, the regulating phase comprising transforming the setpoint to the transformed setpoint using the transformation determined in the learning phase, setting the control signal for the valve responsive to the transformed setpoint, and controlling the opening of the valve based on the set control signal.

8. The method of claim 7, wherein the learning phase further comprises connecting sensors to the thermal energy exchanger for measuring the operating data values related to the power transfer, prior to the recording of the data points, and disconnecting the sensors prior to the regulating phase.

9. A control system for controlling power transfer of a thermal energy exchanger of an HVAC system, the control system comprising at least one processor configured to:
set a control signal for a valve responsive to a plurality of setpoints in the HVAC system;
control an opening of the valve to adjust a flow of a fluid through the thermal energy exchanger, based on the control signal;
measure operating data values for each of the plurality of setpoints, the operating data values being related to the power transfer by the thermal energy exchanger;
record a plurality of data points, each of the data points including, for a setpoint of the plurality of setpoints, the measured operating data values related to the power transfer by the thermal energy exchanger for the setpoint;
determine a fitting curve which fits the plurality of data points;
determine a transformation which maps points on the fitting curve resulting in an energy transfer at a given setpoint to a corresponding point on a transformed curve, the transformed curve having a given target shape;
transform a setpoint for the opening of the valve to a transformed setpoint, using the transformation, and set the control signal for the valve based on the transformed setpoint; and
control the opening of the valve according to the set control signal.

10. The control system of claim 9, wherein the transformed is a linearization transformation and the transformation curve is a linearized curve.

11. The control system of claim 9, wherein the processor is further configured to record the plurality of data points by setting the control signal for the valve according to the setpoint and determining the operating data values, and wherein the operating data values include at least one of:
the flow of the fluid, a temperature difference between an inlet temperature of the fluid entering the thermal energy exchanger and an outlet temperature of the fluid exiting the thermal energy exchanger, and the power transfer effectuated by the thermal energy exchanger.

12. The control system of claim 11, wherein the processor is further configured:
to record the plurality of data points by setting the control signal for the valve based on the setpoint and determining the power transfer by the thermal energy exchanger;
to determine the fitting curve by determining a power transfer curve which fits the plurality of data points, the power transfer curve indicating power transfer as a function of the plurality of setpoints;
to determine the transformation by determining a linearization transformation which transforms the power transfer curve into a linearized power transfer curve; and
to control the opening of the valve by transforming a setpoint of the plurality of setpoints to the transformed setpoint, using the linearization transformation.

13. The control system of claim 12, wherein, to determine the power transfer by the thermal energy exchanger, the processor is further configured to measure the flow of the fluid, the inlet temperature of the fluid entering the thermal energy exchanger, and the outlet temperature of the fluid exiting the thermal energy exchanger.

14. The control system of claim 9, wherein the processor is further configured to record the data points, determine the fitting curve, and determine the transformation on an ongoing basis, for an iterative adjustment of a power transfer characteristic of the thermal energy exchanger in the HVAC system.

15. The control system of claim 9, wherein the processor is further configured:
to perform a learning phase, the learning phase comprising the processor recording the data points, determining the fitting curve, and determining the transformation; and
to perform a regulating phase subsequent to the learning phase, while no longer recording one or more of the operating data values, the regulating phase comprising the processor ransforming the setpoint to the transformed setpoint, using the transformation determined in the learning phase, setting the control signal for the valve to the transformed setpoint,and controlling the opening of the valve based on the set control signal.

16. The control system of claim 15, wherein the processor is further configured to perform the learning phase by connecting sensors to the thermal energy exchanger for measuring the operating data values related to the power transfer, prior to recording the data points, and disconnecting the sensors prior to performing the regulating phase.

17. A non-transitory computer-readable medium having stored thereon a computer program code which, when executed by a processor of a control system for controlling power transfer of a thermal energy exchanger of an HVAC system, causes the processor to perform the following steps:
setting, by the control system, a control signal for a valve responsive to a plurality of setpoints in the HVAC system;
controlling an opening of the valve in the HVAC system to adjust a flow of a fluid through the thermal energy exchanger, based on the control signal;
measuring operating data values for each of the plurality of setpoints, the operating data values being related to the power transfer by the thermal energy exchanger;

recording a plurality of data points, each of the data points including, for a setpoint of the plurality of setpoints, the measured operating data values related to the power transfer by the thermal energy exchanger for the setpoint;

determining a fitting curve which fits the plurality of data points;

determining a transformation which maps points on the fitting curve resulting in an energy transfer at a given setpoint to a corresponding point on a transformed curve, the transformed curve having a given target shape; and transforming a setpoint for the opening of the valve to a transformed setpoint, using the transformation, and setting the control signal for the valve based on the transformed setpoint; and controlling the opening of the valve according to the set control signal.

18. The non-transitory computer-readable medium of claim 17, wherein the transformed is a linearization transformation, and the transformation curve is a linearized curve.

19. The non-transitory computer-readable medium of claim 17, wherein, to record the plurality of data points, the computer program code is further configured to cause the processor to set the control signal for the valve according to the setpoint and determine the operating data values, and wherein the operating data values include at least one of: the flow of the fluid, a temperature difference between an inlet temperature of the fluid entering the thermal energy exchanger and an outlet temperature of the fluid exiting the thermal energy exchanger, and the power transfer effectuated by the thermal energy exchanger.

20. The non-transitory computer-readable medium of claim 17, wherein:

to record the plurality of data points, the computer program code is further configured to cause the processor to set the control signal for the valve based on the setpoint and determine the power transfer by the thermal energy exchanger;

to determine the fitting curve, the computer program code is further configured to cause the processor to determine a power transfer curve which fits the plurality of data points, the power transfer curve indicating power transfer as a function of the plurality of setpoints;

to determine the transformation, the computer program code is further configured to cause the processor to determine a linearization transformation which transforms the power transfer curve into a linearized power transfer curve; and to control the opening of the valve, the computer program code is further configured to cause the processor to transform the setpoint to the transformed setpoint, using the linearization transformation.

* * * * *